June 23, 1970 R. F. ARNOLDY 3,517,156

WELDING APPARATUS AND METHOD

Filed June 6, 1968

Roman F. Arnoldy
INVENTOR.

BY James H. Weiler
Jefferson D. Giller
Dudley R. Dobie, Jr.

ATTORNEYS

June 23, 1970 R. F. ARNOLDY 3,517,156
WELDING APPARATUS AND METHOD
Filed June 6, 1968 2 Sheets-Sheet 2
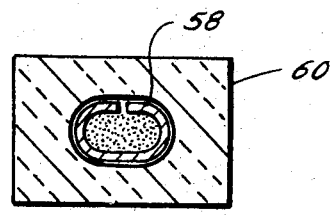
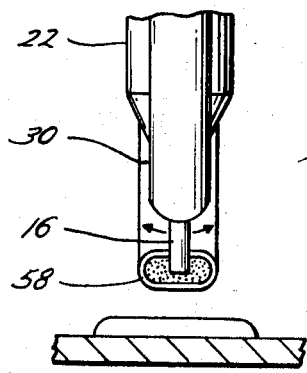
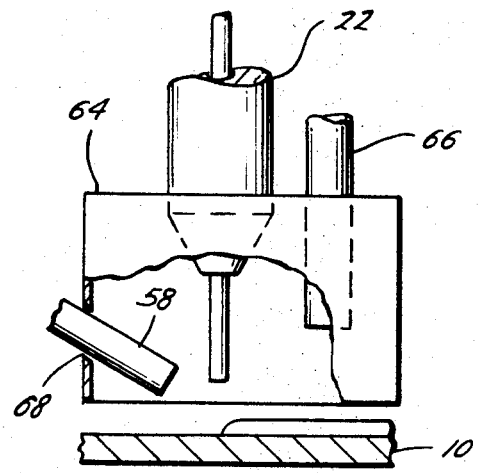
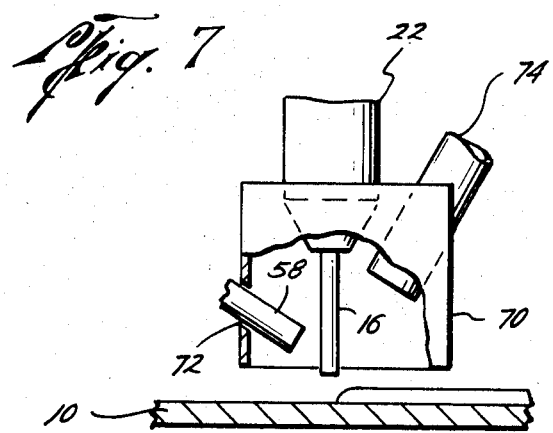
Roman F. Arnoldy
INVENTOR.
BY
ATTORNEYS United States Patent Office 3,517,156
Patented June 23, 1970

3,517,156
WELDING APPARATUS AND METHOD
Roman F. Arnoldy, Houston, Tex., assignor to R. I. Patents, Inc., Houston, Tex., a corporation of Texas
Filed June 6, 1968, Ser. No. 734,990
Int. Cl. B23k 9/04
U.S. Cl. 219—76                                   19 Claims

ABSTRACT OF THE DISCLOSURE

A method of welding utilizing a consumable electrode and a foil tube having a wall less than about 0.005 inch thick and being filled with alloy granules. A welding head assembly including a consumable electrode, a roll of metal foil less than 0.005 inch thick, rollers forming a trough in the foil, means for depositing alloy granules into the trough, rollers closing the trough over the alloy granules and forming a foil tube filled with the alloy granules, and means to move the foil tube toward the arc zone formed by the consumable electrode.

BACKGROUND OF THE INVENTION

The field of art to which the invention pertains is electric arc welding and more particularly to electric arc welding in which the weld bead is comprised of melted metal from a consumable electrode and alloy granules. In the present invention, the alloy granules are supplied from a thin-walled tube filled with the alloy granules, the tube being formed on the welding head.

"Welding" as used herein includes securing pieces of base metal together, cladding, and the like. "Bulk welding" as used herein means electric arc welding using a consumable electrode and a layer of granular alloy material laid on the base metal. Pat. No. 3,076,888 issued Feb. 5, 1963 to R. F. Arnoldy for an invention in "Method of Producing Weld Coatings or Fusion Welds" illustrates several examples of bulk welding but with the granules being deposited on the base metal as granules and not from a tube.

Pat. No. 3,078,363 issued Feb. 19, 1963 to W. C. Johnson for a "Weld Strip" teaches the use of welding with a consumable electrode and a comparatively thick-walled tube filled with alloying ingredients which tube is not formed on the welding head.

SUMMARY OF THE INVENTION

It is conventional in certain types of electric arc welding to have the final weld bead composed of an alloy of iron or steel. For various reasons, it is often not practical to attempt to have this alloy in the form of a consumable electrode, especially for use with automatic or semi-automatic welding equipment where the electrode is generally coiled in lengths of as much as 100 feet or more. A consumable electrode is made which is a tube having a steel wall filled with the alloying material. To obtain the best results with conventional automatic or semi-automatic welding machines, the wall of the tube is at least about 0.015 inch thick to give the tube sufficient strength to be handled by such welding equipment without collapsing. However, with such thick-walled tubes, the proportion of alloying material to tube wall metal is so small that their use is necessarily limited to analysis where the percentage of alloy-forming elements of the final weld bead is relatively low.

Bulk welding is a way to supply material of a proper analysis for the desired weld bead. In bulk welding, the arc from the consumable electrode is directed against a layer of loose granular material with the heat of the arc melting both the granular material and the electrode and forming a puddle of these molten metals which blend together. However, the layer of alloy granules is not always evenly spaced over the entire weld area because the layer is often triangular in cross section and the layer sometimes becomes unduly dispersed by the physical force of the electric arc and as a result the final analysis of the weld bead is not uniform.

It is a general object of the present invention to provide an apparatus and a method for electric arc welding utilizing a consumable electrode and alloy granules (including powders) in which the granules are not dispersed by the physical force of the arc.

Another object of the present invention is to provide a method and apparatus for electric arc welding in which alloy granules are placed at the arc zone in a metal tube having a wall thickness less than 0.005 inch.

A more specific object is the use of such a tube which is generally rectangular in cross section and which is formed on the welding head.

Another object is to provide such an apparatus in which the consumable electrode may be oscillated to weld a wider area as the welding head is moved forward.

The method of this invention generally comprises forming a foil tube having a metal foil wall less than 0.005 inch thick and filled with alloy granules, supporting the full tube on a welding head having a consumable electrode, and moving an end of the foil tube to the arc zone at a rate proportional to the rate of movement of the electrode to the arc zone.

By the use of the foil tube, the alloy granules are melted before they have an opportunity to become dispersed by the force of the arc and the generally rectangular cross section of the foil tube permits an even distribution of the alloy granules in the arc zone.

The method and apparatus of the present invention may be used in open arc welding, with a shielding from the air with flux, gas shielding, or mineral shielding.

BRIEF DESCRIPTION OF THE DRAWINGS

FIG. 4 is a view along the line 4—4 of FIG. 1,
FIG. 5 is a view along the line 5—5 of FIG. 1,
FIG. 6 is a modification illustrating the use of the invention with a gas shield,
and
FIG. 7 is a further modification illustrating the use of a mineral shield.

DESCRIPTION OF THE PREFERRED EMBODIMENTS

Figure 1:
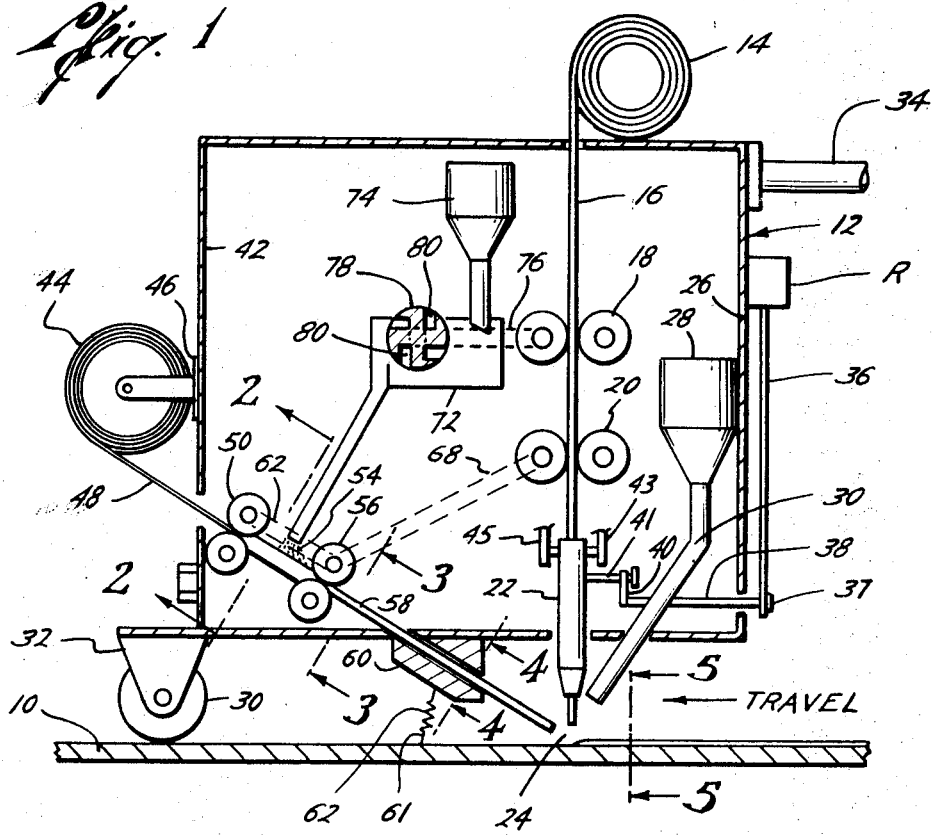
FIG. 1 is a partial sectional side view of an apparatus suitable for use with the invention.

Referring to FIG. 1, the reference numeral 10 generally designates the surface to be welded with a weld bead shown at 11. Suspended above the surface 10 is a welding head 12 carrying a coil 14 of consumable electrode 16 which passes downwardly through first and second sets 18 and 20 of electrode feeding rollers and through an electrode nozzle 22 to the arc zone 24 immediately above the surface 10. Power to one of the electrode feeding rollers 20, from a source not illustrated, moves the electrode 16 downwardly into the arc zone.

Secured to a wall 26 of the welding head 12 is a flux hopper 28 with a flux feed tube 30 having its lower end adjacent the lower end of the consumable electrode 16 for depositing a shielding flux.

The entire welding head 12 is supported above the surface 10 by a wheel 30 which is mounted in a bracket 32 on the welding head 12 as well as by a boom 34. The boom 34 may extend from an automatic welding machine, or it may be a portion of a hand-held bar for semi-automatic operation by a welder.

All the foregoing apparatus is conventional and no further description thereof is necessary.

Oscillating means for the electrode 16 is provided which includes a reciprocating means R on the wall 26 of the welding head 12 connected by a link 36 to an eccentric pin 37 on a first rock arm 38 having on its other end an eccentric arm 40 connected to a second rock arm 41 secured to the electrode nozzle 22. The electrode nozzle 22 is pivotally supported by the pivots 43 and 45 so that operation of the reciprocating means R oscillates the electrode nozzle 22 and that portion of the consumable electrode 16 in it resulting in the motion shown by the arrows in FIG. 5. The reciprocating means R is conventional and no further description of it is necessary.

Figure 3:
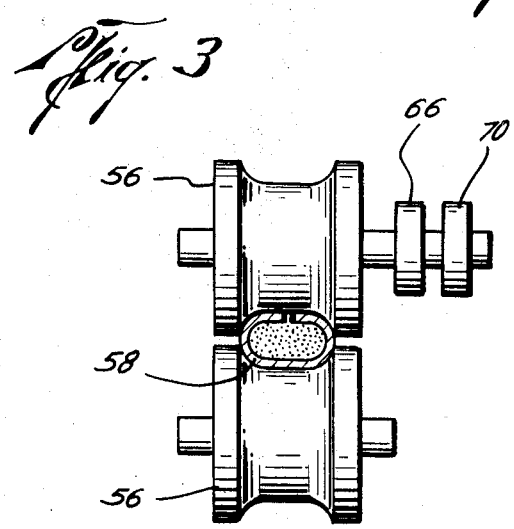
FIG. 3 is a view along the line 3—3 of FIG. 1.
Figure 2:
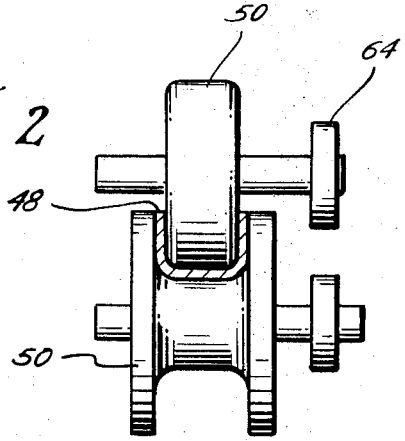
FIG. 2 is a view along the line 2—2 of FIG. 1.

Secured to the forward wall 42 of the wellhead 12 on a mounting bracket 46 is a coil 44 of a strip of metal foil 48 less than 0.005 inch thick and preferably about 0.002 inch thick and about 3½ inches wide. The strip of foil 48 passes through an opening in the wall 42 and between a set of forming rollers 50 which form the strip of foil 48 into a trough having a generally flat bottom and upstanding sides as best seen in FIG. 2. After the trough leaves the forming rollers 50, it passes under a tube 52 which deposits alloy granules 54 into the trough. The trough filled with the alloy granules 54 then passes through a set of closing rollers 56 which bend the upstanding sides of the trough over the alloy granules 54 and forms a foil tube 58 generally rectangular in cross section as best seen in FIG. 3.

Because of the thinness of the wall of the foil tube 58, it has a tendency to sag and so upon leaving the closing rollers 56, the foil tube 58 is supported and guided by support means in the form of a nozzle 60 (FIG. 4) through which the foil tube 58 slides to a point near the arc zone 24. No support is provided for the trough ahead of the closing rollers 56 as the froming rollers 50 and the closing rollers 56 are spaced closely together.

The foil tube 58 may be electrically connected to the surface 10 or left electrically neutral. If it is to be electrically connected to the surface 10, this can be done by a flexible connection 61 from the foil tube nozzle 60 to the surface 10 with or without a resistance 62 (FIG. 1).

The heat from the arc in the arc zone 24 causes the foil tube 58 to melt and be deposited on the surface 10 together with the molten metal from the electrode 16 in the form of a puddle. If the foil tube 58 is electrically connected to the surface 10, the arc from the electrode 16 will contact both the foil tube 58 and the puddle. If the foil tube 58 is not electrically connected to the surface 10, the electrode 16 will not arc to the foil tube 58 but instead will arc to the puddle. However, the foil tube 58 is melted by its proximity with the high-temperature arc and contact with the puddle if it should be contacting the puddle at that time.

At the time the end of the foil tube 58 in the arc zone 24 is melted, the end of the foil tube 58 may either be suspended above the surface 10 as illustrated in FIG. 1 or it can be caused to lie on the surface 10 such as by removing the nozzle 60.

Means to drive the foil tube 58 to the arc zone 24 is provided by the forming rollers 50 and the closing rollers 56 which are linked together by a belt 62 between a pulley 64 on one of the forming rollers 50 and a pulley 66 on one of the closing rollers 56 and driven by a belt 68 between a pulley 70 mounted on the same shaft as the pulley 66 and one of the electrode feeding rollers 20. By this arrangement, both the forming rollers 50 and the closing rollers 56 move the foil coil 58 toward the arc zone 24 and the rate of feed of the foil tube 58 to the arc zone is proportional to the rate of movement of the electrode 16 to the arc zone with the size of the pulley 70 determining the proportion.

Preferably, the means for depositing the alloy granules 54 in the trough in the strip of foil 48 includes a hopper 74 into which the alloy granules 54 are placed. The hopper feeds into a bin 72 in which rotates a feed wheel 78 having a plurality of recesses or pockets 80 which pick up the granular material from the bin 72 at a measured rate and deposit it into the tube 52. Such an apparatus is disclosed in my Pat. No. 3,060,307 to which reference is here made. The feed wheel 78 is driven by a belt 76 connected to one of the electrode feeding rollers 18 so that the rate of feed of the alloy granules into the trough in the strip of foil 48 is proportional to the movement of the electrode 16.

A typical example of the foil tube and electrode composition to make a 12% chromium stainless steel deposit is an electrode 16 of mild steel containing about 0.12% carbon; a metal foil 48 of mild steel having about 0.08 to 0.12% carbon; and alloy granules 54 of 20% low carbon ferrochromium and 80% iron with the low carbon ferrochromium containing 70% chromium, 0.1% carbon and the balance iron.

While a generally rectangular shape in the foil tube is preferred as it gives a more even deposit on the surface 10, the shape of the foil tube 58 can obviously be changed by changing the shape of the forming rollers 50, the closing rollers 56 and the nozzle 60 such as to make a round foil tube. The shape of the foil tube is important whether it rests directly on the surface 10 or is suspended slightly above it at the time the foil tube is melted. If the foil tube is round, more metal will be deposited in the middle of the puddle than at the edges with a result in more chilling in the middle and less penetration of the work by the metal deposited in the middle and more penetration away from the middle. Sometimes this is desirable. Change in shape of the foil tube will also give a variance in bead heighth and width, penetration, occurrence of voids or flux traps, surface smoothness, and the tie-in to the adjacent beads.

The consumable electrode 16 is here illustrated in the shape of a wire and, with a wire shape, the electrode will normally be oscillated across the width of the foil tube 58. If the consumable electrode 16 should be in the shape of a strip, then oscillation would normally not be used.

The modification in FIG. 6 shows the use of a conventional gas shield rather than the use of flux as a shielding means. In this modification, the flux hopper 28 and flux feed tube 30 are eliminated and a gas shield 64 is provided around the arc zone 24. An appropriate gas inlet 66 is provided to the arc zone and the foil tube 58 passes through an opening 68 at one side of the gas shield 64. The electrode nozzle 22 passes through a transverse slot, not shown, in the top of the gas shield 64 to permit oscillation of the electrode nozzle 22 and the electrode 16. Such gas shielding is conventional and a fuller explanation of gas shielding may be found in such U.S. patents as No. 3,102,025 and No. 2,727,125.

FIG. 7 represents a modification in which a mineral shield is used in the arc zone rather than a flux shielding means. In this modification, the flux hopper 28 and flux feed tube 30 are eliminated and a mineral shield 70 is provided around the arc zone 24. An appropriate mineral tube 74 is provided to the arc zone and the foil tube 58 passes through an opening 72 at one side of the mineral shield 70. The electrode nozzle 22 passes through a transverse slot, not shown, in the top of the mineral shield 70 to permit oscillation of the electrode nozzle 22 and the electrode 16. Mineral shielding is relatively conventional and no further explanation thereof is necessary.

The present invention is well adapted to carry out the objects and attain the ends and advantages mentioned, as well as others inherent therein. While the presently preferred embodiment of the invention has been given for the purpose of disclosure, numerous changes and details of construction and the combination, shape, size, arrangement of parts, or uses may be resorted to without departing from the spirit and scope of the invention as defined in the following claims.

What is claimed is:

1. In a welding head which moves parallel to a metal surface and has means to move a consumable electrode to the arc zone formed by the consumable electrode at the metal surface, the improvement comprising
   (a) a roll of a strip of metal foil less than 0.005 inch thick,
   (b) a set of forming rollers for forming the strip of metal foil into a trough,
   (c) means for depositing alloy granules into the trough in the metal foil,
   (d) a set of closing rollers for closing the trough over the alloy granules and forming a foil tube, and
   (e) foil tube drive means moving the foil tube to the arc zone formed by the consumable electrode.

2. The combination of claim 1 including foil tube support means suporting the foil tube between the closing rollers and a point adjacent to the arc zone.

3. The combination of claim 1 including means for oscillating the electrode at the arc zone as the welding head is moved forward.

4. The combination of claim 2 including means for oscillating the electrode at the arc zone as the welding head is moved forward.

5. The combination of claim 1 including means for shielding the metal surface at the arc zone.

6. The combination of claim 1 including means to oscillate the electrode as the welding head is moved forward and means to shield the metal surface at the arc zone.

7. The combination of claim 1 in which the foil is about 0.002 inch thick.

8. In a welding head which moves parallel to a metal surface and has means to move a consumable electrode to the arc zone formed by the consumable electrode at the metal surface, the improvement comprising
   (a) a roll of a strip of metal foil less than 0.005 inch thick,
   (b) a set of forming rollers for forming the strip of metal foil into a trough having a generally flat bottom and upstanding sides,
   (c) means for depositing alloy granules into the trough in the metal foil,
   (d) a set of closing rollers for bending the upstanding sides over the alloy granules and forming a foil tube generally rectangular in cross section, and
   (e) foil tube drive means moving the foil tube to the arc zone formed by the consumable electrode.

9. The combination of claim 8 including foil tube support means supporting the foil tube between the closing rollers and a point adjacent the arc zone.

10. The combination of claim 8 including means for oscillating the electrode as the welding head is moved forward.

11. The combination of claim 10 including foil tube support means supporting the foil tube between the closing rollers and the point adjacent the arc zone.

12. The combination of claim 8 including means for shielding the metal surface at the arc zone.

13. The combination of claim 8 including means to oscillate the electrode as the welding head is moved forward and means to shield the metal surface at the arc zone.

14. The combination of claim 8 in which the foil is about 0.002 inch thick.

15. The method of welding a metal surface from a welding head which moves parallel to the metal surface which welding head has means to move a consumable electrode to the arc zone formed by the consumable electrode at the metal surface, said method comprising
   (a) forming on the welding head a foil tube having a metal wall less than about 0.005 inch thick and filled with alloy granules, and
   (b) moving an end of the foil tube to the arc zone formed by the consumable electrode at a rate proportional to the rate of movement of the electrode to the arc zone.

16. The method of claim 15 including supporting the foil tube between its place of formation and a point adjacent the arc zone.

17. The method of claim 15 including oscillating the foil tube while moving the welding head forward.

18. The method of claim 16 including the step of oscillating the foil tube while moving the welding head forward.

19. The method of claim 15 including the step of shielding the metal surface at the arc from the air during welding.

References Cited

UNITED STATES PATENTS

| | | | |
|---|---|---|---|
| 2,083,309 | 6/1937 | Applegate | 219—76 X |
| 3,078,363 | 2/1963 | Johnson | 219—146 |
| 3,184,578 | 5/1965 | Albers et al. | 219—76 X |
| 3,428,774 | 2/1969 | Hans-Dieter Faust et al. | 219—76 |

JOSEPH V. TRUHE, Primary Examiner

J. G. SMITH, Assistant Examiner

U.S. Cl. X.R.

219—130, 145